Nov. 2, 1926.

W. S. GORTON 1,604,989

OPERATING RELAY

Filed May 1, 1923   2 Sheets-Sheet 1

Inventor:
William S. Gorton
by *[signature]*, Att'y

Patented Nov. 2, 1926.

1,604,989

UNITED STATES PATENT OFFICE.

WILLIAM S. GORTON, OF LONDON, ENGLAND, ASSIGNOR TO WESTERN ELECTRIC COMPANY, INCORPORATED, OF NEW YORK, N. Y., A CORPORATION OF NEW YORK.

OPERATING RELAY.

Application filed May 1, 1923. Serial No. 635,865.

This invention relates to relay operation and to repeating current waves, and aims to obtain rapid and reliable operation of relays, and to render a relay selectively responsive to opposite directions of alternating current energy flow in a circuit, and to control the pointing of a repeater in a line.

In accordance with the invention, a relay may be rendered selectively responsive to opposite directions of energy flow in a line by a network having arms conjugate respectively to the line sections at each side of the relay, the currents in these arms controlling the relay differentially, so that it will be operated in one sense in response to energy flowing in one direction in the line and in the opposite sense in response to energy flowing in the other direction in the line.

In one form of the invention a relay is rendered selectively responsive to opposite directions of alternating current energy flow in a line by a network, preferably some form of Wheatstone bridge network, between the line and the relay so associated with the line as to be fed with currents which are proportional to the voltage of the line and also to be fed with currents which are proportional to the current in the line. The resulting currents in certain arms of the bridge are of different magnitudes, and which of these arms receives the greater current depends only upon the direction of flow of energy in the line. The currents in these arms are made to control a relay differentially, whereby the relay is caused to be selectively responsive to the direction of energy flow in the line.

In one application of the invention to the reversal of the pointing of a telephone repeater, a relay, made selectively responsive to the direction of energy flow in the line by means of a network connected to the line and to the relay, controls the reversal of the pointing of the repeater in the line, and the position of the repeater in the line is so changed when the pointing of the repeater is reversed that the network is always on the output side of the repeater.

The switching of the repeater may be accomplished by means of a single stage of relay action involving mechanical motion or a train of electromagnetic relays may be employed. The action of the electromagnetic relays may be made rapid and reliable by causing a condenser to discharge current through the relay windings for assisting the relays to operate, when they begin operation, and by causing a condenser charging current to flow through the relay windings upon completion of travel of the relay armatures to prevent chattering of the armatures.

In the accompanying drawings Fig. 4ª discloses a switching device for rendering variably effective the windings of an input potentiometer.

Figure 1:
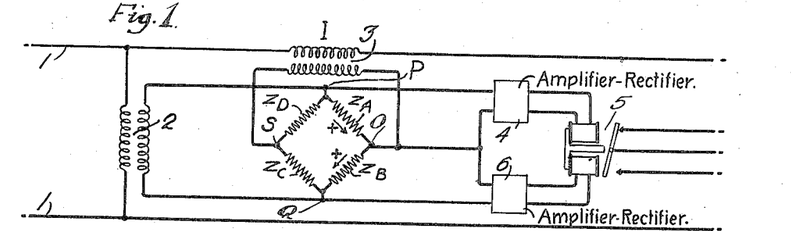
Fig. 1 shows a circuit wherein a Wheatstone bridge network is interposed between a relay and a line to render the relay selectively responsive to opposite directions of alternating current energy flow in the line.

For various purposes, for instance for controlling voice operated repeaters in a manner set forth hereinafter, a relay operating selectively according to the direction of flow of energy in a circuit is desirable. An ordinary wattmeter responds selectively in accordance with direction of energy flow but is obviously unsuited for direct use in telephone circuits. It would be possible to get a directional selective action by applying to the current and potential windings of a wattmeter amplified voltages obtained from impedances in a telephone circuit, but such an instrument would suffer from the low torque characteristic generally of electrical instruments employing alternating magnetic fields. Fig. 1 shows a network for causing a relay to operate selectively according to the direction of flow of energy in a circuit and making use finally of direct currents instead of alternating ones.

$Z_A$, $Z_B$, $Z_C$, and $Z_D$ are impedances, preferably non-reactive resistances, forming a Wheatstone bridge which is balanced for all frequencies. The directions considered positive in these impedances are shown by the arrows. An E. M. F. proportional to V, the potential across the line 1 at any instant, is impressed through a transformer 2, between the points P and Q. An E. M. F. proportional to I, the current in the line 1 at any instant, is impressed, through a transformer 3, between the points O and S.

The E. M. F. across $Z_A$ is applied to an amplifier-rectifier 4 and causes direct current to flow in one winding of a polarized relay 5. The E. M. F. across $Z_B$ acts through an amplifier-rectifier 6 to cause direct current to flow in the other winding of the polarized relay. These direct currents flow through the windings of the relay in opposite directions with respect to the magnetic circuit of the relay. Thus the armature of the relay is drawn one way or the other depending upon the relative magnitudes of the E. M. F.'s just mentioned.

Let the currents flowing in the arms of the bridge be denoted by $I_A$, $I_B$, $I_C$, $I_D$. Let the currents flowing in the arms due to I alone be denoted by $I_{A_I}$, $I_{B_I}$, etc., and those due to V alone by $I_{A_V}$, $I_{B_V}$, etc. Then by the principle of superposition, the current at any instant flowing in $Z_A$ is the sum of the currents $I_{A_I}$ and $I_{A_V}$ at that instant; and similarly the current flowing in $Z_B$ is the sum of the currents $I_{B_I}$ and $I_{B_V}$; etc.

Figure 2:
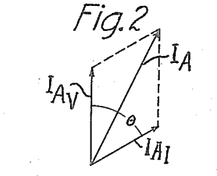
Figs. 2 and 3 are vector diagrams of the currents in the bridge arms.
Figure 3:
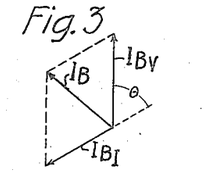

Consider now for definiteness that the impedances of the arms are all equal non-reactive resistances and that all currents are simple harmonic quantities of the same period. The conditions in arm $Z_A$ when both I and V are acting are shown by the vector diagram of Fig. 2. The angle $\theta$ will be small if, as is generally the case, the telephone line approximates a non-reactive resistance. The conditions in arm $Z_B$ are shown by the vector diagram of Fig. 3, wherein the magnitudes of the vectors representing the current components in the network arm and the angle $\theta$ are the same as in the preceding diagram. Now $$I_A^2 = I_{A_V}^2 + I_{A_I}^2 + 2 I_{A_V} I_{A_I} \cos \theta$$

and $$I_B^2 = I_{B_V}^2 + I_{B_I}^2 - 2 I_{B_V} I_{B_I} \cos \theta$$
$$= I_{A_V}^2 + I_{A_I}^2 - 2 I_{A_V} I_{A_I} \cos \theta$$

Consequently, as long as $\theta$ lies between 90° and $-$ 90°, that is, as long as energy is flowing over the line in a certain direction, $I_A$ is greater than $I_B$. When $\theta$ lies between $+$ 180° and $+$ 90° or between $-$ 180° and $-$ 90°, that is, when the direction of flow of energy is reversed, $I_B$ is greater than $I_A$. The difference between $I_A$ and $I_B$ is, of course, greatest when $I_{A_V} = I_{A_I}$ and $\theta = 0$. Owing to the difference in the values of $I_A$ and $I_B$ there will be differences in the E. M. F's across $Z_A$ and $Z_B$ which will cause the armature of the polarized relay to move one way or the other as explained above. Obviously the same result will occur for any frequency or combination of frequencies as long as the direction of energy flow is the same for all of the frequencies.

We have thus a relay system, employing a direct current relay with its relatively high torque, which responds selectively to the direction of flow of energy in a telephone line or other circuit.

Figure 4:
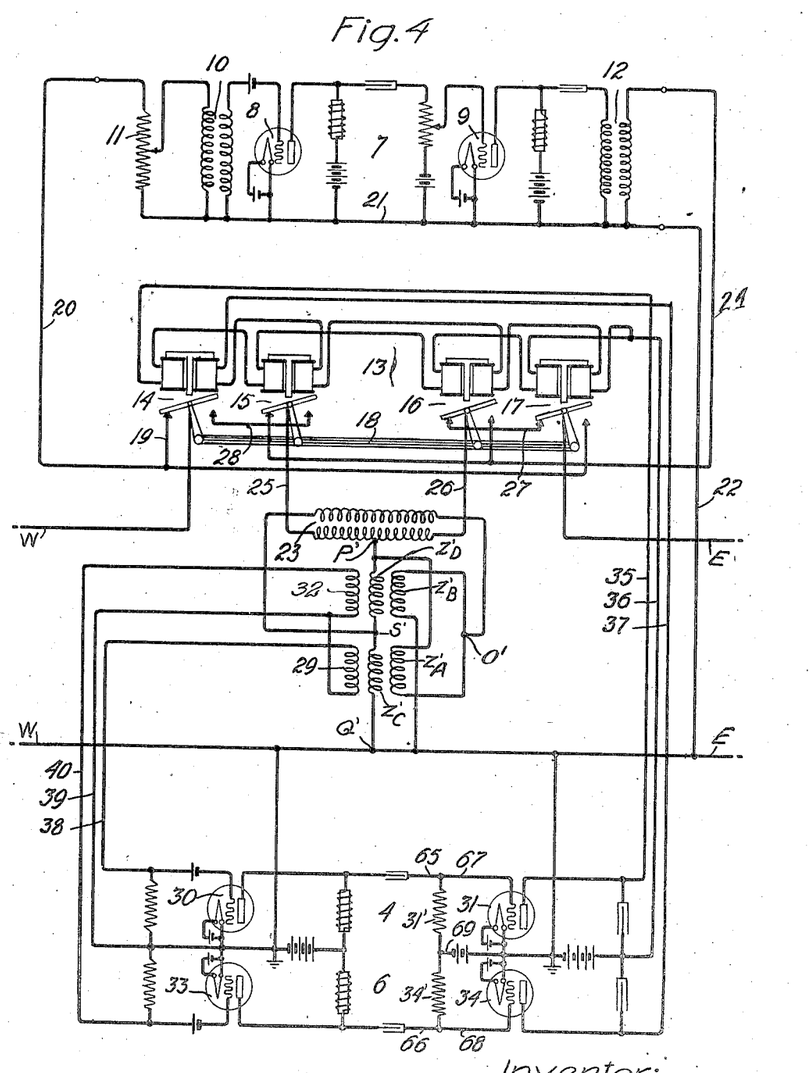
Fig. 4 shows an application of the invention to the reversal of the pointing of a telephone repeater.

In Fig. 4 a repeater 7 comprising two tandem connected repeating elements 8 and 9, an input transformer 10, a potentiometer 11 and an output transformer 12, is reversibly connected to repeat from line W to line E and from E to line W, the reversing being accomplished by a relay means, or reversing switch 13. This reversing switch comprises four relays 14, 15, 16 and 17, preferably polar relays having armatures mechanically connected as indicated by bar 18.

When the switch 13 is in the position shown, the relay 14 connects line W to feed potentiometer 11, through the circuit from the upper conductor of line W, armature of relay 14, leads 19 and 20, potentiometer 11, and leads 21 and 22 to the lower line conductor. Also, with the switch 13 in the position shown, the relay 15 connects the output transformer 12 to feed line E through a winding of a transformer 23 and through contacts of relays 16 and 17, the circuit being from the upper terminal of the secondary winding of transformer 12 through lead 24, armature of relay 15, lead 25, primary winding of transformer 23, lead 26, armature of relay 16, lead 27, armature of relay 17, to the upper conductor of line E and from the lower line conductor through lead 22 to the lower end of the secondary winding of transformer 12.

When the reversing switch is operated, in the manner described hereinafter, to the position alternative to that in which it has been shown, the line E is connected to feed potentiometer 11 through the armature and right-hand contact of relay 17, lead 20, potentiometer 11, and leads 21 and 22; and at the same time, the output transformer 12 is connected to feed line W through lead 24, right-hand contact of relay 16, lead 26, primary winding of transformer 23, lead 25, right-hand contact of relay 15, lead 28, right-hand contact of relay 14, line W, and lead 22 back to transformer 12.

It will be noted that when the reversing switch 13 operates from the position shown to the alternate position, it not only reverses the pointing of the repeater between lines W an E, but also changes the position of the repeater in the line, from its connection at the left of transformer 23 and between the armatures of relays 14 and 15 to the position at the right of transformer 23 in which lead 27 is shown connected. Similarly, when the reversing switch 13 operates to the position in which it is shown, the repeater is not only reversed but is shifted from a position between line E and transformer 23 to a connection between line W and transformer 23. The purpose in thus changing the position of the repeater in the line will appear hereinafter.

The windings of each of the relays 14, 15, 16 and 17 of Fig. 4 controlled in the same general manner as the windings of relay 5 of Fig. 1. In Fig. 4 the secondary winding of transformer 23 is connected to points S', O', which correspond to points S and O respectively of the Wheatstone bridge network of Fig. 1, windings $Z'_A$, $Z'_B$, $Z'_C$ and $Z'_D$ of Fig. 4 corresponding to the bridge arms $Z_A$, $Z_B$, $Z_C$, and $Z_D$ respectively of Fig. 1. The windings $Z'_A$ and $Z'_C$ are on one magnetic circuit and have a common secondary winding 29, which feeds amplifier-rectifier 4 comprising an amplifying tube 30 and an amplifying and rectifying tube 31. The windings $Z'_B$ and $Z'_D$ are on another magnetic circuit, and have a common secondary winding 32, which feeds amplifier-rectifier 6 comprising an amplifying tube 33 and an amplifying and rectifying tube 34. When energy flows in one direction in lines W and E, the currents in each of the windings $Z'_A$, and $Z'_C$ due to the current in the line at transformer 23 and to the voltage across the line at P', Q' are more nearly in phase in each of these windings than are the corresponding currents in each of the windings $Z'_B$, $Z'_D$, just as Figs. 2 and 3 show that when energy flows in one direction in line 1 in Fig. 1 the currents in $Z_B$ due to the current in the line at transformer 3 and to the voltage across the line at P, Q are more nearly in phase than are the corresponding currents in $Z_D$. Windings $Z'_A$ and $Z'_C$ act cumulatively upon winding 29; and windings $Z'_B$ and $Z'_D$ act cumulatively upon winding 32. The amplifier-rectifier 4 in Fig. 4 feeds the left-hand windings of each of the relays 14, 15, 16 and 17 through leads 35 and 36, just as the amplifier-rectifier 4 of Fig. 1 feeds the upper winding of relay 5 of Fig. 1; and the amplifier-rectifier 6 in Fig. 4 feeds the right-hand windings of each of the relays 14, 15, 16 and 17 through leads 37 and 36, just as the amplifier-rectifier 6 of Fig. 1 feeds the lower winding of relay 5. In each of the relays 14, 15, 16 and 17, as in the relay 5, the two windings of the relay act oppositely upon the magnetic circuit of the relay. It will be noted that in Fig. 4 the extremities P' and Q' of one diagonal of the Wheatstone bridge network comprising windings $Z'_A$, $Z'_B$, $Z'_C$ and $Z'_D$ are conductively connected across the line without the interposition of any transformer corresponding to the transformer 2 of Fig. 1, the connection of point P' to the line being made at the midpoint of the primary winding of transformer 23 whereas the corresponding connection of the primary winding of transformer 2 of Fig. 1 to the line is at the left-hand end of the primary winding of transformer 3. The modification in Fig. 4, employing transformers $Z'_A$, $Z'_C$, 29 and $Z'_B$, $Z'_D$, 32 instead of the resistance arms $Z_A$, $Z_C$, $Z_B$, and $Z_D$ of Fig. 1, introduces less loss in transmission between lines W and E than the form of the invention shown in Fig. 1 would introduce.

The operation of the system shown in Fig. 4 will now be apparent. With switch 13 in the position shown, the system is set for repeating from line W to line E, the input and output circuits of the repeater being as traced above. The system remains in this condition until transmission approaches the repeater output over line E; for when energy approaches the input of the repeater over line W and is amplified and transmitted to line E, the currents in $Z'_B$ and $Z'_D$ will be greater than those in $Z'_A$ and $Z'_C$, as explained above, so that winding 32 will cause amplifier-rectifier 6 to feed to the right-hand winding of each of relays 14, 15, 16 and 17 a current greater than that which winding 29 causes amplifier-rectifier 4 to feed to the left-hand winding of each of the relays 14, 15, 16 and 17. When transmission approaches the repeater output from line E, the currents in $Z'_A$ and $Z'_C$ will be greater than those in $Z'_B$ and $Z'_D$ as explained above, so that winding 29 will cause amplifier-rectifier 4 to feed to the left-hand winding of each of relays 14, 15, 16 and 17 a current greater than that which winding 32 causes amplifier-rectifier 6 to feed to the right-hand winding of each of the relays 14, 15, 16 and 17. These switching relays therefore reverse, causing the pointing of the repeater to be reversed and the position of the repeater in the line to be changed as explained above. The direction of flow of the transmission through the directional circuit comprising transformer 23 and windings $Z'_A$, $Z'_B$, $Z'_C$, and $Z'_D$, is the same after the accomplishment of the reversal of the repeater as when the reversal of the repeater was initiated; and therefore the amplified transmission from line E to line W tends to hold the repeater pointed toward line W. The repeater remains pointed toward line W until transmission approaches its output from line W, whereupon the pointing of the repeater and the position of the repeater in the line are again changed. As a result of the changing of the position of the repeater in the line at each reversal of the repeater, the directional circuit comprising transformer 23 and windings $Z'_A$, $Z'_B$, $Z'_C$ and $Z'_D$ is always in the line at the output side of the repeater so that it can be reached by transmission approaching the repeater from either line.

For a given adjustment the means shown in Fig. 1 or in Fig. 4 for rendering the relay devices selectively responsive to opposite directions of energy flow in the lines will operate best when employed on lines having impedances within certain limits. For lines having the proper impedance the current in one of the arms, $Z_A$ or $Z_B$, of the bridge is zero and the current in the adjacent arm $Z_B$ or $Z_A$, has a finite magnitude, the bridge and the line constituting a biconjugate network, with the input resistance of one amplifier rectifier conjugate to one of the line sections, W or E, and the input resistance of the other amplifier rectifier conjugate to the other line. The impedance relations between these four parts of the biconjugate network may be regarded as corresponding to those between the line, balancing network, repeater output branch and repeater input branch of the maximum output hybrid coil connection commonly employed in 22-type repeaters. In such a hybrid coil connection the line and the repeater output branch may be regarded as corresponding to the two line sections W and E of the repeater circuit of this invention, and the balancing network and the repeater input branch of the 22-type repeater circuit may be regarded as corresponding to the impedances of the input circuits of the amplifier rectifiers of the circuit of this invention. In the circuit of this invention, the network connecting the two line sections and the input circuits of the amplifier rectifiers should preferably present to each of said line sections and input circuits an impedance approximately equal to the impedance of that one of the two line sections or the two input circuits, so that the network will be a maximum output network. Such networks have been treated by Campbell and Foster in their article entitled "Maximum output networks for telephone substations and repeater circuits", published in the Transactions of the American Institute of Electrical Engineers, 1920, Vol. 39, part 1, pages 231 to 290.

The means described above for rendering the relay devices selectively responsive to oppositely directed transmissions will work directionally regardless of the impedances of the lines into which it works, although by sacrificing in part this advantage it is possible, as will now be explained, to have directional means more responsive to one direction of energy flow than to the other.

For the sake of simplicity the following explanation of the manner in which the direction sensing means may be made more responsive to energy from one direction than to oppositely directed energy is made with reference specifically to the type of directional circuit shown in Fig. 1; but it will be obvious that the same considerations apply to the type of directional circuit shown in Fig. 4.

The statement is made above that, under certain specified conditions, for energy flowing one way $I_A$ is greater than $I_B$ and, for energy flowing the other way $I_B$ is greater than $I_A$. For the directional relay device to work directionally for differences of any amount in the magnitudes of $I_A$ and $I_B$ it is obvious that equal currents in $Z_A$ and $Z_B$ must (for the conditions specified) produce equal operating effects on the polarized relay. If this be the case, it is evident that the device must be equally sensitive to both directions of energy flow. Now, in practice, the repeater works into telephone lines the impedance of which lies between certain definite limits. Consequently the ratio of the magnitudes of $I_A$ and $I_B$ will lie within certain limits. Call the ratio of the magnitude of $I_A$ to that $I_B$ "$p$". Suppose the repeater to be pointed in such a direction that for energy flowing out of the repeater $I_A$ is always greater than $I_B$; then the lower limit of $p$ will be greater than unity. Designate this limiting value of $p$ as $k$. Let the amplifier rectifiers be so arranged that the current $1_A$ produces an effect "$I_A a$" in the polarized relay and the current $I_B$ produces an effect "$I_B a k$". Then for the output circuit giving the minimum value of "$p$" the effects produced in the polarized relay will be equal. For circuits giving more than the minimum value of "$p$" $I_A$ will produce a greater effect than $I_B$ and the repeater will preserve its position. For energy flowing into the output side of the repeater $I_B$ will be greater than $I_A$ and the effect of $I_B$ on the polarized relay will be greater than that of $I_A$ in the ratio "$k I_B/I_A$", consequently the repeater will reverse its direction. Suppose now that energy is flowing out of the repeater and that the listener starts sending voice currents into the output of the repeater. This has the effect of decreasing either the resultant current or the resultant voltage at the output of the repeater, which causes $I_A$ and $I_B$ to approach equality. When $I_A$ is greater than $I_B$ in the ratio $k$ the effects of $I_A$ and $I_B$ on the polarized relay are equal, and when $I_A/I_B$ is somewhat less than $k$ the relay will operate and the repeater will reverse whereas, if the polarized relay is made equally sensitive to both $I_A$ and $I_B$, $I_A$ must be actually less than $I_B$ before the repeater can reverse. This means that, with the device adjusted as described here, energy flowing into the output of the repeater from the circuit which has here been considered the output circuit is not required actually to reverse the flow of energy from the repeater, but only to reduce it in a certain ratio, in order to reverse the repeater.

It also follows that if the effect of $I_B$ on the relay is made more than $k$ times as great as the effect of $I_A$ on the relay, when energy comes from the direction which normally makes $I_A$ greater than $I_B$, $I_A$ will no longer control the relay. The relay, then, in response to the effect of $I_B$ will point the repeater against the incoming energy which will again reverse the repeater. This continued automatic reversing of the repeater will result if energy is sent into the input while the output is working into an open circuit, a short circuit, or, in general, into an impedance outside of certain limits. Indeed, by virtue of this characteristic the device can be employed as an automatic indicator of trouble in the line.

Figure 4A:
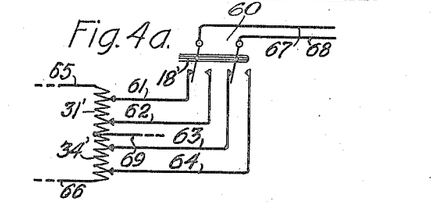

In order that breaking in, by the listener in a system such as that shown in Fig. 4, upon a talker or upon noise currents originating on the input side of the repeater, may be accomplished with ease for each direction of transmission, the amplifier rectifiers 4 and 6 may be alike, and the resistances 31' and 34' in the input circuits of the tubes 31 and 34 respectively, may be used as indicated in Fig. 4ª to serve as potentiometer resistances for the tubes, a switch 60 being so arranged that when its left-hand contacts are closed, the grid of tube 31 is connected to a high voltage tap conductor 61 or resistance 31' and the grid of tube 34 is connected to a low voltage tap conductor 63 on resistance 34', whereas when the right-hand contacts of switch 60 are closed the grid of tube 31 is connected to a low voltage tap conductor 63 on resistance 31' and the grid of the tube 34 is connected to a high voltage tap conductor 64 on resistance 34'. The left-hand contacts of the switch are closed when the repeater is switched to transmit east, and the right-hand contacts are closed when the repeater is switched to transmit west. This operation of the switch 60 is accomplished by a bar 18' which may be, for instance, an extension of the bar 18 of Fig. 4. The leads 65, 66, 67, 68 and 69 in Fig. 4ª correspond to the leads similarly designated in Fig. 4, although in Fig. 4ª the leads 67 and 68 from the grids of the tubes 31 and 34 respectively (not shown in Fig. 4ª) are connected to the resistances 31' and 34' through switch 60 and the taps 61 to 64 instead of directly, as in Fig. 4. The tap conductors 61 and 62, and 63 and 64, are made adjustable along the resistors 31' and 34' respectively, to take care of variations in the adjustments of the input potentiometers of tubes 8 and 9.

Figure 5:
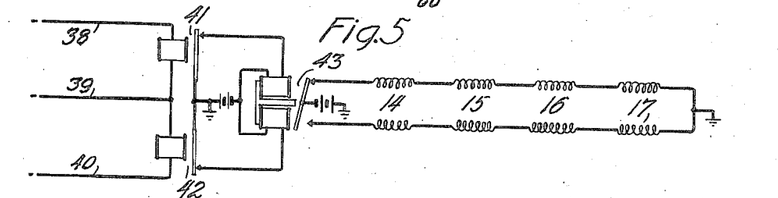
Figs. 5, 6 and 7 show modifications of the circuit of Fig. 4.

Fig. 5 shows means which may be substituted for the amplifier-rectifier of Fig. 1 or of Fig. 4 for controlling the windings of relays 14, 15, 16 and 17 in response to the currents in $Z_A$ and $Z_B$ or in windings 29 and 32. Leads 38, 39 and 40 in Fig. 5 are the leads from coils 29 and 32, as indicated by Fig. 4. In Fig. 5, leads 38 and 39 supply current to a relay 41, and leads 40 and 39 supply current to a relay 42. These relays are of the same sensitivity and may be of any type which is capable of operation by voice currents and which by its operation opens or closes a contact. They are shown as of the vibratile contact type with normally closed contacts which in effect insert a high resistance between their contacts upon operation of the relays. The relay contacts control currents through the windings of a relay 43 which is preferably a polar relay. The armature of this polar relay remains on the side to which it has been thrown until an impulse comes to throw it in the opposite direction. The armature contacts of the polar relay control repeater switching relays 14, 15, 16, and 17, only the windings of which are shown in Fig. 5.

In the operation of the circuit of Fig. 5, when energy is coming from the west relay 42 receives more energy than relay 41; and when energy is coming from the east, relay 41 receives more energy than relay 42. Consider the repeater to be pointed to the east and let voice energy come from the east. Then relay 41 will operate first, because it is receiving more energy, and will cause the armature of relay 43 to move over the opposite contact, thus switching the repeater. After this has been accomplished the relay 41 will still receive more energy than relay 42, and so the repeater will continue to point west until voice currents come from the west and cause the repeater to be reversed again.

When the system of Fig. 4 is modified in accordance with Fig. 5, it is preferable to omit the link or bar 18, since the reasons for employing this link where the repeater switching relays are controlled, as in Fig. 4, without the use of any control relay involving mechanical motion, do not exist if those switching relays are controlled by means of a control relay as in Fig. 5 or as in Figs. 6 and 7 to be described hereinafter. If the switching relays in Fig. 4 were precisely alike, they would operate simultaneously without the aid of bar 18. In practice however, it is preferable to have a mechanical connection, since it is difficult to maintain the relays all in exactly the same adjustment.

Figure 6:
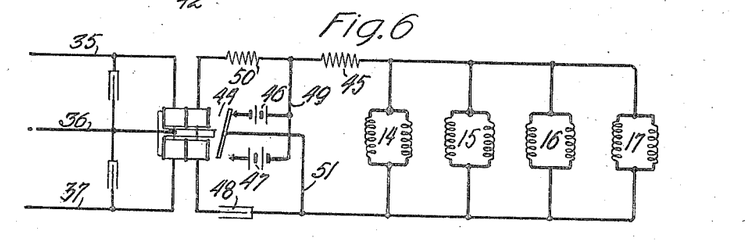

Fig. 6 shows the two windings of each of the relays 14, 15, 16 and 17 connected in parallel instead of in series as in Figs. 4 and 5, and also shows the windings of each of these relays connected in parallel with, instead of in series with, the windings of all of the others. Since the relays are of the polar type, current in one direction through their windings will cause their armatures (not shown in Fig. 6) to move one way and current in the other direction through their windings will cause their armatures to move the other way. These armatures may be employed to switch a repeater (not shown in Fig. 6) just as in Fig. 4, and the relays may be controlled by voice currents through the action of a directional circuit and amplifier-rectifiers as in Fig. 4, but with the interposition of a control relay 44, preferably of the polar type, between the amplifier-rectifiers (not shown in Fig. 6) and the switching relays 14, 15, 16 and 17. Thus, the leads 35, 36 and 37, which in both Fig. 4 and Fig. 6 are the output leads from the amplifier-rectifiers 4 and 6, feed the upper left-hand and the lower left-hand windings, respectively, of the control relay 44, in Fig. 6, instead of feeding the left-hand and right-hand windings, respectively, of switching relays 14 to 17 as in Fig. 4. One end of each of the windings of relays 14 to 17 is permanently connected, preferably through a resistance 45, to one pole of a battery 46 and to the pole of opposite sign on a battery 47. The armature of relay 44 is arranged, as shown in the drawing, to connect either of the other poles of these batteries to the other end of each of the windings of relays 14 to 17. Thus, with the armature of relay 44 in the position shown, battery 46 supplies current to the windings of relay 14 to 17 in one direction, and when current from say the amplifier-rectifier 6 which feeds the lower left winding or relay 44 causes the armature of relay 44 to shift to its alternate contact, battery 47 will supply current to the windings of relays 14 to 17 in the opposite direction, so that the switching relays 14 to 17 will switch the repeater. Then when current from the amplifier-rectifier 4 traversing the upper left-hand winding of relay 44 causes the armature of that relay to move back to the position shown in the drawing, battery 46 will supply current to the windings of relays 14 to 17, whereupon the repeater will again be switched. To reduce the delay in the operation of the switching relays 14 to 17 which might be caused by the time required for the control relay 44 to operate, and to insure positive operation of this control relay in response to the smallest impulse sufficient to make the tongue leave a contact, this control relay may be provided with an auxiliary winding, shown as the two series connected coils on the right-hand end of the relay, and with a condenser 48 for discharging through the auxiliary winding whenever the armature leaves one of its contacts and thereby accelerating the travel of the control relay armature and throwing that armature over against its other contact, and for causing a condenser charging current to flow through the auxiliary winding upon initial contact of the armature with either contact, to thereby hold the relay armature against that contact and diminish the time of chatter and thus decrease the time required for effective closure of the contact. The operation of the condenser 48 and the auxiliary winding of relay 44 in insuring positive operation of the relay and reducing the time required for the relay to operate will now be set forth in greater detail. With the armature of the relay in the position shown, the condenser 70 is so charged by battery 46 that the left-hand terminal of the condenser is positive and the right-hand terminal negative. The circuit which causes the condenser to be thus charged extends from the right-hand or positive end of battery 46, through lead 49, a resistance 50, and the auxiliary winding of relay 44, condenser 48, lead 51, and armature of relay 44 to the negative pole of battery 46. Now when current from the amplifier-rectifier 6, feeding the lower left-hand winding of relay 44, causes the armature to leave its upper contact and begin travel toward its lower contact as described above, the condenser 48 discharges over a path extending from the left-hand terminal of the condenser upward through the auxiliary winding of relay 44, through resistances 50 and 45, downward through the windings of relays 14 to 17, and back to condenser 48. The auxiliary winding of relay 44 is so arranged on the magnetic circuit of that relay that this condenser discharge current passing upward through the auxiliary winding causes the travel of the armature of relay 44 to be accelerated and causes the armature to be thrown over against its lower contact. Then, upon initial closure of the lower contact of the relay, battery 47 not only sends current upward through the windings of relays 14 to 17 through a path extending from the left-hand or positive pole of battery 47, through the armature of relay 44, lead 51, the windings of relays 14 to 17, resistance 45, and lead 49 back to battery 47, but also sends upward through the auxiliary winding of relay 44 a charging current for condenser 48 over a path extending from the positive pole of battery 47 through the armature of relay 44, lead 51, condenser 48, the auxiliary winding of relay 44, resistance 50, and lead 49 back to battery 47. This condenser charging current causes the armature of relay 44 to be held on its lowest contact, to avoid chattering and thus reduce the time taken for effective closure of the contact, as indicated above. The battery 47 of course continues to send current upward through the windings of the switching relays until current from amplifier-rectifier 4 feeding the upper left-hand winding of relay 44 causes the armature of relay 44 to leave its lower contact and begin travel toward its upper contact, whereupon the discharging and the charging of the condenser 48 accelerate the travel of the armature and throw the armature over against its upper contact and hasten effective closure of the upper contact in a manner which will be apparent from the description just given of the action of the condenser. The resistance 50 functions to prevent oscillations and consequent chattering of the armature of relay 44 during the charging of the condenser. The resistance 45 functions to prevent windings 14 to 17 from substantially short-circuiting the battery 46 or 47 which supplies them with current in case the resistance of these windings is not sufficient to accomplish this purpose.

Although the circuit of the condenser 48 and the auxiliary winding of control relay 44 accelerate the action of the control relay and insure positive operation of the control relay with an operating current sufficient only to produce a slight chatter on either of its contacts, it will be noted that the throwing impulse for the control relay armature due to discharge of the condenser passes through the windings of switching relays 14 to 17 in such a direction as to hold them in their past position, from which it is desired to operate them. Consequently, the inertia of this discharge current must be overcome after the control relay armature has completed its travel before operation of the switching relays can take place. The circuit of Fig. 7 overcomes this difficulty and causes operation of the switching relays to begin immediately upon the "break" of the control relay.

Figure 7:
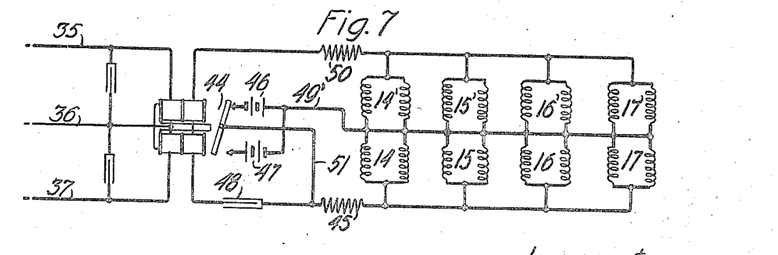

In Fig. 7 the switching relays 14 to 17 (only the windings of which are shown in Fig. 7) have windings 14', 15', 16' and 17', respectively, opposing those windings of these relays which are shown in Fig. 6. That is, when current traverses windings 14 and 14' in series, the two windings oppose, etc. The windings 14', 15', 16' and 17' are connected in circuit, in Fig. 7, in series with the resistance 50. Fig. 7 is otherwise the same as Fig. 6. Each of the windings 14', 15', 16' and 17' preferably has more turns than the winding which it opposes The operation of the circuit of Fig. 7 will now be described, it being understood that the circuit may be combined with the repeater organization of Fig. 4 just as may the circuit of Fig. 6. With the armature of relay 44 in the position shown, the condenser 48 is so charged by battery 46 that the left-hand terminal of the condenser is positive and the right-hand terminal negative. The circuit which causes the condenser to be thus charged extends from the right-hand or positive end of battery 46, through lead 49', windings 14' to 17' in parallel, the auxiliary winding of relay 44, condenser 48, lead 51, and armature of relay 44, to the negative pole of battery 46. No current is flowing through windings 14' to 17', but a holding current for relays 14 to 17 is passing through the lower windings of these relays, the circuit for this current extending from the right-hand end of battery 46, through lead 49', the lower windings of relays 14 to 17, lead 51, and armature of relay 44 to battery 46. Now, when current from the amplifier-rectifier 6, feeding the lower left-hand winding of relay 44, causes the armature to leave its upper contact condenser 48 discharges over a path extending from the left-hand terminal of the condenser through the auxiliary winding of relay 44, downward through all of the windings of relays 14 to 17, including windings 14' to 17', and back to the condenser. Since each of the windings 14', 15', 16' and 17' has more turns than the winding which it opposes, the resultant effect upon the switching relays 14 to 17 of the condenser discharge through all of the windings of these relays is just the opposite of the effect upon relays 14 to 17 produced by the condenser discharge in Fig. 6. That is, in Fig. 7 the condenser discharge gives the switching relays a throwing impulse, so that they start to operate immediately upon the "break" of the control relay 44 and before the "make" of the control relay. The discharge of the condenser acts upon relay 44 the same as in Fig. 6, of course. Then, upon initial closure of the lower contact of relay 44, battery 47 not only sends current upward through the lower windings of relays 14 to 17 through a path extending from the left-hand end of battery 47, through the armature of relay 44, lead 51, lower windings of relays 14 to 17, and lead 49' back to battery 47, but also sends upward through the auxiliary winding of relay 44 and downward through windings 14' to 17' a charging current for the condenser, over a path extending from the positive pole of battery 47, through the armature of relay 44, lead 51, condenser 48, auxiliary winding of relay 44, windings 14' to 17', and lead 49', back to battery 47. This condenser charging current not only causes the armature of relay 44 to be held firmly on its lower contact as in the case of Fig. 6, but also assists the current in the lower windings of the switching relays 14 to 17 to hold the armatures of these switching relays against the contacts to which they have just been thrown. After the condenser discharge current dies down, only the lower windings of the relays 14 to 17 remain energized, to hold these relays in the position to which they have been operated. It may be pointed out that if these lower windings were omitted, or all of the windings of relays 14 to 17 were connected in the circuit in the position in which windings 14' to 17' are shown connected, and a mere resistance connected in the circuit in the position in which the lower windings of relays 14 to 17 are shown connected, then after the completion of the operation of the control relay and the switching relays, there would be no current through any of the windings or relays 14 to 17 to hold these relays in the position in which their operation had left them, for of course the condenser 48 would not transmit a steady direct current. It is for this reason that some of the windings of the relays 14 to 17 are preferably connected to oppose the action of windings 14' to 17' when the condenser is discharging. The operation of the circuit of Fig. 7 when current from amplifier-rectifier 4 feeding the upper left-hand winding of relay 44 causes the armature of relay 44 to leave its lower contact and begin travel toward its upper contact, is similar to the action of the circuit as just described, and therefore will be apparent without being set forth in detail.

What is claimed is:

1. In combination, a circuit, a relay device, and means for rendering said device selectively responsive to opposite directions of alternating current energy flow in said circuit, said means comprising means for deriving alternating current from said energy, rectifying said derived current, and supplying said rectified current to said relay device.

2. In combination, a circuit, a relay, and means for rendering said relay selectively responsive to opposite directions of alternating current energy flow in said circuit, said means comprising a Wheatstone bridge network connected between said circuit and said relay.

3. In combination, a circuit, a relay, and means for rendering said relay selectively responsive to opposite directions of alternating current energy flow in said circuit, said means comprising a network having a plurality of arms so connected to said circuit as to derive two currents from different parts of said circuit and superpose said currents in each of two said arms but with greater phase displacement between the currents in one of said two arms than in the other of said two arms, and said means also comprising connections between said two arms and said relay.

4. In combination in a line, a circuit and a relay system selectively responsive to opposite directions of energy flow in said circuit, said system comprising a two-winding relay device and means for causing the controlling effect upon the relay device of energy flowing in one direction in said circuit to be greater than the controlling effect upon the relay device of energy of the same magnitude flowing in the opposite direction in said circuit, said means comprising means for applying to each of the windings of said relay device rectified speech waves derived from the line.

5. In combination, a circuit and a relay system selectively responsive to opposite directions of alternating current energy flow in said circuit, said system comprising a relay device and two energy transfer paths from said circuit including means for rectifying said alternating current energy, the transmitting characteristics of said paths being proportioned to cause the controlling effect upon the relay device of energy flowing in one direction in said circuit to be greater than the controlling effect upon said relay device of energy of the same magnitude flowing in the opposite direction in said circuit.

6. In combination, a circuit, a relay device, and means for rendering said relay device selectively responsive to opposite directions of alternating current energy flow in said circuit, said means comprising a network connected to said circuit and having a plurality of arms, means for producing a control effect upon said relay device in response to current flowing in one of said arms, and means for producing a greater control effect upon the relay device in response to current of the same magnitude in said other arm.

7. In combination, a circuit and a relay system normally selectively responsive to opposite directions of alternating current energy flow in said circuit, said system comprising a relay device and means normally operative to hold said relay device operated to one position in response to alternating current waves flowing in one direction in said circuit and operative when waves are being transmitted in both directions in said circuit for reversing the relay device when the electromotive force waves tending to reverse the direction of flow of energy in the circuit are of magnitude less than sufficient to cause said reversal of direction of flow of current waves in said circuit.

8. In combination, a circuit, a relay device, and means for rendering said relay device selectively responsive to opposite directions of energy flow in said circuit, said means comprising a network conjugate respectively to two parts of said circuit, and means for supplying electromotive forces from different parts of said network to said relay device.

9. In combination, a circuit, a relay device, and means for rendering said relay device selectively responsive to opposite directions of energy flow in said circuit, said means comprising a Wheatstone bridge network, means effectively connecting the terminations of one of the diagonals of said bridge across said circuit so that the bridge is fed with currents which are proportional to the voltage across said circuit, means effectively connecting the terminations of the other diagonal of said bridge to said circuit so that the bridge is also fed with currents which are proportional to the current in said circuit, and means for controlling said relay device in accordance with the difference between the voltage across one of the arms of said bridge and the voltage across another arm of said bridge.

10. In combination, a circuit having two portions, a relay device comprising two windings, and means for rendering said relay device selectively responsive to opposite directions of energy flow in said circuit, said means comprising a network having arms conjugate respectively to said portions of said circuit, a rectifier fed with the voltage across one of said arms and a rectifier fed with the voltage across another of said arms, said rectifiers supplying direct currents to said windings in such senses, respectively, as to operate said relay in opposite directions.

11. A two-way repeating system comprising a line, a unidirectionally transmitting repeater, and a relay system, said relay system comprising relay devices, means connected to said line for rendering said relay devices selectively responsive to opposite directions of energy flow in said line, and connections whereby, upon operation of said relay devices, the pointing of said repeater in said line is reversed and the position of said repeater in said line is so changed as to maintain said means always in the output circuit of said repeater.

12. A two-way repeating system comprising a line, a unidirectionally transmitting repeater, relay means connected to said line and having contacts, and connections between said line, said repeater, and said relay contacts whereby upon operation of said contacts the pointing of said repeater in said line is reversed and the position of said repeater in said line is so changed as to maintain said means always in the output circuit of said repeater.

13. A two-way repeating system comprising a unidirectionally transmitting repeater, and a relay system operable by amplified energy from said repeater, said relay system comprising relay devices, means for rendering said relay devices selectively responsive to opposite directions of energy flow in said line, and connections between said line, said means, and said relay devices whereby upon operation of said relay devices both the pointing of said repeater in said line and the sense in which amplified energy from said repeater passes through said relay system are reversed.

14. A two-way repeating system comprising a line, a unidirectionally transmitting repeater, and a relay system, having a single stage of mechanical motion, for reversing the pointing of said repeater in said line in response to alternating current energy transmission in said line.

15. A two-way repeating system comprising a line, a unidirectionally transmitting repeater, and a relay system comprising switches for reversing the pointing of said repeater in said line and stationary means for rendering said switches selectively responsive to opposite directions of energy flow in said line.

16. In combination, a circuit, a relay having differential windings and an armature, and means for subjecting said relay armature to an actuating force in one sense whenever energy flows in one direction in said circuit and for subjecting said relay to an actuating force in the opposite sense whenever energy flows in the opposite direction in said circuit, said means comprising a Wheatstone bridge network so connected to said circuit as to have an electromotive force applied across one of its diagonals proportional to the electromotive force across said circuit and to have an electromotive force applied across its other diagonal proportional to the current in said circuit, and said means also comprising means for applying for predetermined impedance conditions in said circuit to one of said relay windings a direct current electromotive force capable of producing an actuating effect upon said relay armature bearing a given ratio to the current in one arm of said bridge and for applying to said other relay winding a direct current electromotive force capable of producing an actuating effect upon said relay armature bearing said given ratio to the current in an arm of said bridge adjacent to said one arm.

17. The method of operating a contact device selectively in accordance with the direction of alternating current energy flow in a circuit, which comprises deriving from said circuit currents proportional to the voltage across and the current in said circuit, respectively, superposing said two derived currents with substantially the phase displacement existing between the current in and the voltage across said circuit and deriving an electromotive force proportional to the resultant current, superposing said two derived currents with a phase displacement substantially equal to 180° minus said first mentioned phase displacement and deriving an electromotive force proportional to the resultant current, producing two rectified currents from said two derived electromotive forces, respectively, and combining the energies of said two rectified currents and applying the resultant energy to said control device.

18. The method of operating a relay device having differential windings selectively in accordance with the direction of alternating current energy flow in a circuit, which comprises producing direct currents in said windings deriving from said circuit alternating currents proportional to the voltage across and the current in said circuit, respectively, superposing said two derived currents with substantially the phase displacement existing between the current in and the voltage across said circuit and deriving an electromotive force proportional to the resultant current, superposing said two derived currents with a phase displacement substantially equal to 180° minus said first mentioned phase displacement and deriving an electromotive force proportional to the resultant current, and interrupting one or the other of said direct currents in accordance with the relative magnitudes of said derived electromotor forces.

19. The method of operating a control device selectively in accordance with the direction of alternating current energy flow in a circuit which comprises deriving two alternating current energies from points in said circuit at substantially the same energy level, balancing said alternating current energies against each other and supplying the resultant energy to said control device.

20. A two-way repeating system comprising a line, a unidirectionally transmitting repeater, means operable to point said repeater in either direction in said line, and means connected to said line at one side only of said repeater and responsive to transmission in said line for causing said first mentioned means to point said repeater in either direction.

21. In combination, a circuit, means for deriving from said circuit two electrical forces of the same kind but the sense of one of which, with respect to the sense of the other, reverses upon the reversal of the direction of energy flow in said circuit, and for combining said forces into a resultant force; a current path, means for producing direct current in said path, and stationary means for controlling said current in response to said resultant forces.

22. A two-way repeating system comprising a line, a unidirectionally transmitting repeater, means operable to reverse the pointing of said repeater in said line, and means connected to said line at one side only of said repeater for causing said first mentioned means to point said repeater in opposite directions in said line selectively in accordance with opposite directions of alternating current energy flow in said line.

23. In combination, a circuit, a polarized relay device, and means connected between said circuit and said device for rendering said device selectively responsive to opposite directions of energy flow in said circuit said means and said circuit constituting a biconjugate network.

24. In combination, a line comprising two sections, a relay device, and means for rendering said device selectively responsive to opposite directions of energy flow in said line, said means comprising two impedances and a network so connecting said two impedances and said two line sections as to present to each of said line sections and impedances an impedance approximately equal respectively to the impedance of that one of said two line sections or said two impedances.

25. A circuit for transmitting alternating current energy in opposite directions, a relay armature, a winding for operating said armature in one direction only, a winding for operating said armature in the opposite direction only, and means for deriving alternating current energies from different parts of said circuit, combining said derived energies, and applying the resultant effect to said windings.

26. A line, a repeater, means operable to point said repeater in opposite directions in said line, a relay for causing said means to point said repeater in each of said directions, and means for deriving alternating current energies from different parts of said line, combining said derived energies, and applying the resultant effect to said relay.

27. In combination, a circuit, a relay device, and means connected between said circuit and said device for deriving from said circuit currents proportional to the voltage across and the current in said circuit, respectively, and rendering said relay selectively responsive to opposite directions of alternating current energy flow in said circuit.

28. In combination, a circuit, a relay, and means for rendering said relay selectively responsive to opposite directions of alternating current energy flow in said circuit, said means comprising a network having a plurality of arms so connected to said circuit as to derive from said circuit currents proportional to the voltage across and the current in said circuit, respectively, and to combine said currents into two currents the ratio of the magnitudes of which is greater than a certain number for one direction of energy flow in said circuit and less than said number for the other direction of energy flow in said circuit, and said means also comprising connections between said arms and said relay.

29. In combination, a circuit, a relay device, and means for rendering said relay device selectively responsive to opposite directions of alternating current energy flow in said circuit, said means comprising a network so connected to said circuit as to derive therefrom currents proportional to the voltage across and the current in said circuit, respectively, said network having a plurality of arms, and said means also comprising means for producing a control effect upon said relay device in response to current flowing in one of said arms and means for producing a control effect upon the relay device in response to current flowing in said other arm.

30. In combination, a circuit, a relay having differential windings, and means deriving from said circuit currents proportional to the voltage across and the current in said circuit, respectively, said means being so connected to said windings as to cause them to subject said relay to an actuating force in one sense whenever alternating current energy flows in one direction in said circuit and to subject said relay to an actuating force in the opposite sense whenever alternating current energy flows in the opposite direction in said circuit.

31. The method of operating a contact device selectively in accordance with the direction of alternating current energy flow in a circuit, which comprises deriving from said circuit currents proportional to the voltage across and the current in said circuit respectively, producing from said two derived currents two electromotive forces the quantity ratio of which is greater than a certain number for one direction of energy flow in said circuit and less than said number for the other direction of energy flow in said circuit, producing two rectified currents from said two derived electromotive forces, respectively, and combining the energies of such two rectified currents and applying the resulting energy to said control device.

32. The method of operating a differentially wound relay selectively in accordance with the direction of alternating current energy flow in a circuit, which comprises producing direct currents in said windings, deriving from said circuit alternating currents proportional to the voltage across and the current in said circuit, respectively, producing from said two derived currents two electromotive forces, the quantity ratio of which is greater than a given number for one direction of energy flow in said circuit, and less than said number for the other direction of energy flow in said circuit, and interrupting one or the other of said direct currents in accordance with the relative magnitudes of said two electromotive forces.

33. The method of operating a control device selectively in accordance with the direction of alternating current energy flow in a circuit, which comprises deriving two alternating current energies from said circuit, producing from said two derived currents two electromotive forces the quantity ratio of which is greater than a given number for one direction of energy flow in said circuit and less than said number for the other direction of energy flow in said circuit, producing two rectified currents from said two electromotive forces, respectively, and applying the energy of said rectified currents to said control device.

34. In combination, a circuit, a switch device, and means for rendering said device selectively responsive to opposite directions of energy flow in said circuit, said means comprising a network having branches conjugate respectively to two parts of said circuit, means for supplying electromotive force from one part of said network to said switch device, and means for supplying electromotive force from another part of said network to said switch device.

35. In combination, a line comprising two sections, a switch device, and means for rendering said device selectively responsive to opposite directions of energy flow in said line, said means comprising two impedances and a network so connecting said two impedances and said two line sections as to present to each of said line sections and impedances an impedance approximately equal to the impedance of that one of said two line sections or said two impedances.

36. The combination with a circuit comprising two line sections, of a repeater for repeating therebetween, a relay device for controlling said repeater, and means for rendering said device selectively responsive to opposite directions of energy flow in said circuit, said means comprising a network having arms conjugate respectively to two parts of said circuit, means for supplying electromotive force from one part of said network to said relay device, and means for supplying electromotive force from another part of said network to said relay device.

37. The combination with a circuit including two line sections, of a repeater for repeating therebetween, a polarized relay device for controlling said repeater, and means connected between said circuit and said device for rendering said device selectively responsive to opposite directions of energy flow in said circuit, said means and said circuit constituting a biconjugate network.

38. The combination with a line comprising two sections, of a repeater for repeating therebetween, a relay device for controlling said repeater, and means for rendering said device selectively responsive to opposite directions of energy flow in said line, said means comprising two impedances and a network so connecting said two impedances and said two line sections as to present to each of said line sections and impedances an impedance approximately equal to the impedance of that one of said two line sections or said two impedances.

In witness whereof, I hereunto subscribe my name this 16th day of April A. D., 1923.

WILLIAM S. GORTON.